Dec. 28, 1954

G. L. OTTO 2,697,952

CONTINUOUSLY OPERATING MACHINE TOOL

Filed June 30, 1951

INVENTOR
GERHOLD L. OTTO
BY Christopher L. Waal
ATTORNEY

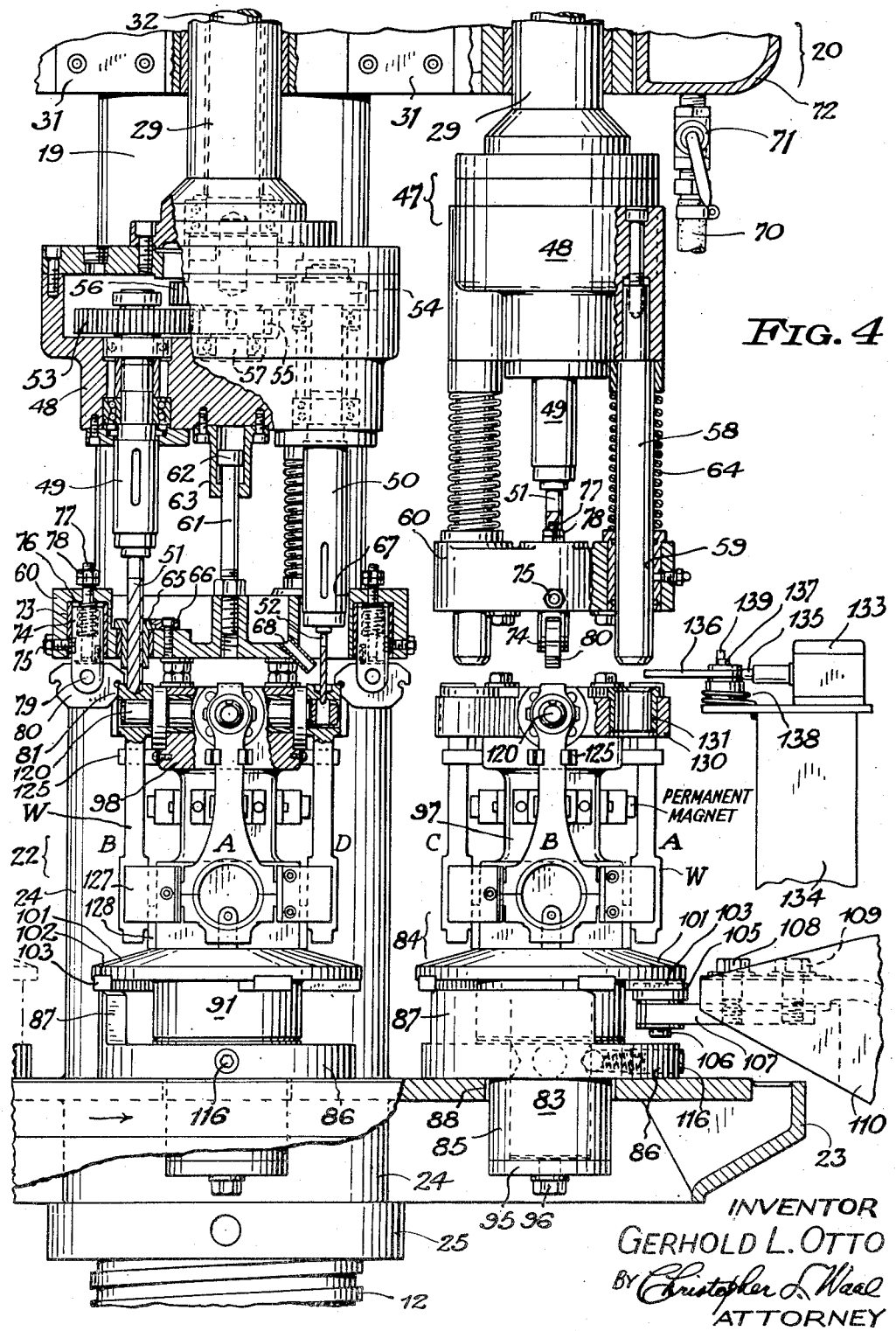

Dec. 28, 1954  G. L. OTTO  2,697,952
CONTINUOUSLY OPERATING MACHINE TOOL
Filed June 30, 1951  4 Sheets-Sheet 4
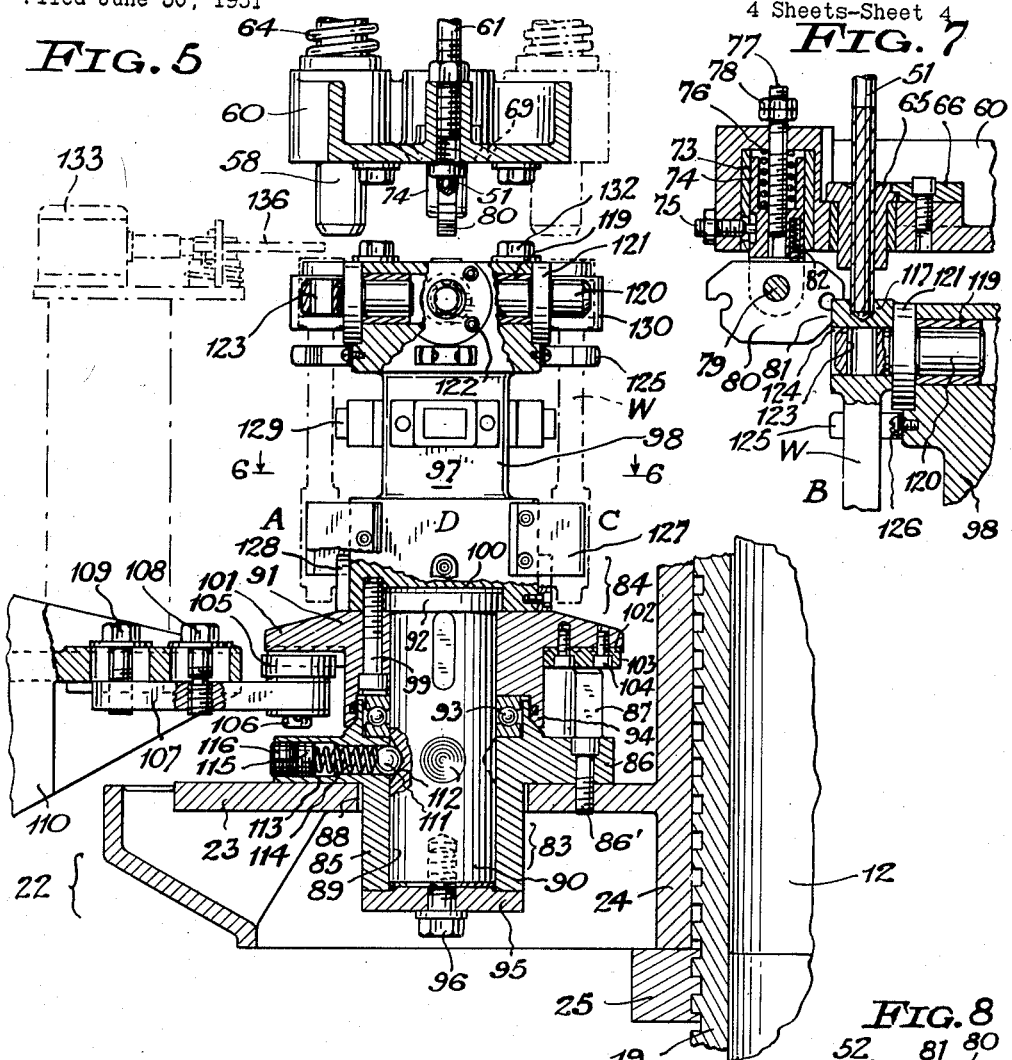
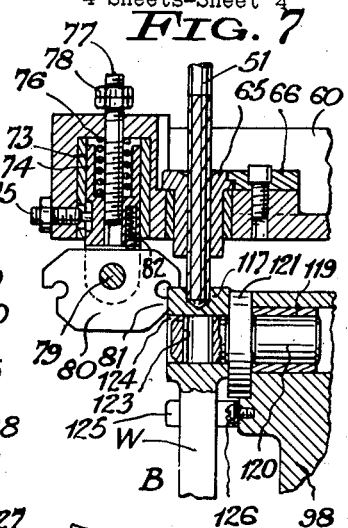
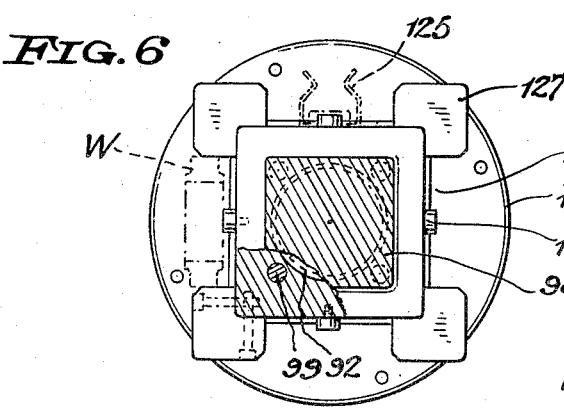
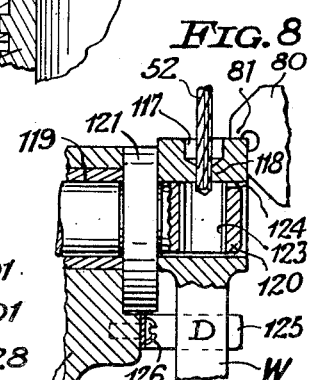
INVENTOR
GERHOLD L. OTTO
BY Christopher L. Waal
ATTORNEY United States Patent Office 2,697,952
Patented Dec. 28, 1954

2,697,952

CONTINUOUSLY OPERATING MACHINE TOOL

Gerhold L. Otto, Menomonee Falls, Wis., assignor to Davis & Thompson Company, West Allis, Wis., a corporation of Delaware Application June 30, 1951, Serial No. 234,536

10 Claims. (Cl. 77—23)

The present invention relates to machine tools of the continuously operating type adapted for production machining of work pieces.

An object of the invention is to provide an improved multiple spindle machine tool of the continuously operating type by which work pieces can be subjected to a succession of different tool operations, such as drilling.

Another object is to provide a machine tool of this type in which the work makes a plurality of circuits with a continuously rotating carrier.

Still another object is to provide a machine tool having a continuously rotating carrier with work holding turrets which are indexed during the rotation of the carrier.

A further object is to provide a continuously operating machine tool having improved means for indexing the turrets to bring the work pieces to different tooling positions.

The invention further consists in the several features hereinafter described and claimed.

In the drawings,

Fig. 4 is a fragmentary elevational view of a portion of the machine as viewed from a side, parts being broken away and parts being shown in section;

Fig. 5 is a fragmentary vertical sectional view of the rotatable work carrier and a work-holding turret thereof.

Fig. 6 is a horizontal sectional view of a work-holding turret taken generally on the line 6—6 of Fig. 5, parts being broken away and parts being shown in section;

Fig. 7 is a detail vertical sectional view of work-clamping and drilling mechanism at one of the drilling stations, and Fig. 8 is a detail vertical sectional view of work-clamping and drilling mechanism at another drilling station.

Figure 1:
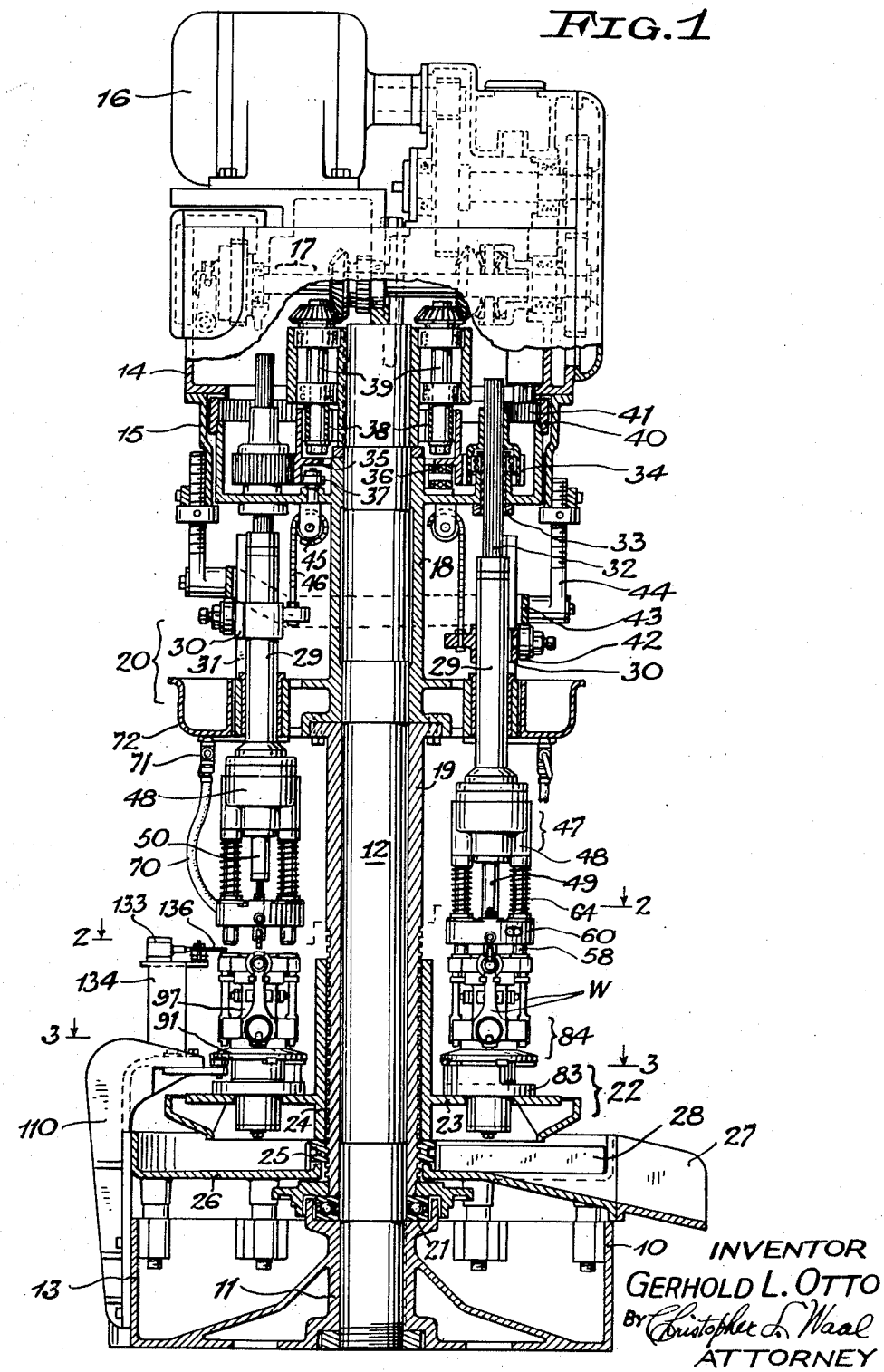
Fig. 1 is an elevational view of a drilling machine constructed in accordance with the invention, parts being shown in section.

In the drawings, the numeral 10 designates a base member or support having a central vertical hub portion 11 in which is rigidly secured the lower end of a cylindrical standard or column 12. The base member forms a coolant reservoir, and for this purpose is provided with an upstanding marginal wall 13.

A casing or head frame 14 is rigidly secured on the upper end portion of the column and includes a marginal skirt member 15 coaxial with the column. An electric motor 16 is mounted on the casing 14 and has a driving connection with suitable transmission gearing 17 mounted in the casing. The casing and gearing may be generally similar to that disclosed in Davis Patent 1,877,277 for Vertical Continuous Drilling Machine, and Davis Patent 1,877,560 for Vertical Continuous Milling Machine, both issued on September 13, 1932.

Rotatably mounted on the column 12 between the casing 14 and the base member 10 is a power-driven sleeve assembly comprising upper and lower sleeves 18 and 19 having their adjacent ends rigidly secured together. The upper sleeve 18 forms a part of a spool-shaped tool carrier 20 hereinafter more fully described, the carrier having an upper portion disposed within the skirt member 15 of the casing 14. The lower sleeve 19 rests at its lower end on a ball thrust bearing 21 mounted in the upper end of the hub portion 11 of the base member. A work carrier 22, hereinafter more fully described, includes a table 23 coaxial with the lower sleeve 19 and rotatable therewith, the table being split diametrically and having an elongated hub portion 24 keyed to and clamped about this sleeve. The table is vertically adjustable on the sleeve 19, as by a supporting nut 25 threaded on the sleeve.

A stationary circular tray 26 adapted to receive chips and coolant is disposed coaxially below the table 23 and is adjustably mounted on the marginal wall 13 of the base member, the tray having an inclined discharge spout 27 at its periphery. A sweep arm 28 is secured to the rotatable sleeve 19 to turn therewith and serves to discharge chips from the tray.

The spool-shaped tool carrier 20 has slidably mounted in its lower portion a circular series or gang of equally spaced vertical spindle bearings or quills 29, the quill circle being arranged coaxially about the axis of the tool carrier. The quills, four of which are shown by way of example, carry respective vertically adjustable collars 30 which extend between and slidably engage upright guides 31 secured at their lower ends to the lower portion of the tool carrier, thus preventing turning of the quills. Vertical spindles 32 are coaxially journalled in the respective quills and have splined upper portions extending upwardly through vertical bearing sleeves 33 secured in the upper portion of the tool carrier. The splined portions of the spindles further extend through the splined, upwardly extended hub portions of driving pinions 34 rotatably mounted on the upper portion of the tool carrier. The pinions 34 mesh with the lower section of a double ring gear 35 which is rotatably supported on the upper portion of the tool carrier and in coaxial relation to the carrier by a series of rollers 36 and 37. A pair of driving pinions 38 mesh with the upper section of the ring gear 35 and are secured to the lower ends of short vertical shafts 39, the shafts 39 being journalled in the casing 14 and forming parts of the transmission gearing 17. The upper peripheral portion of the tool carrier 20 extending within the casing skirt member 15 is provided with an internal ring gear 40 which meshes with pinions 41 (one being shown) forming part of the transmission gearing 17, thus serving to rotate the tool carrier 20 and the attached lower sleeve 19 which mounts the work carrier 22.

As in the above Davis Patent 1,877,277, the quill collars 30 carry rollers 42 which cooperate with an adjustably mounted, stationary cam track member 43 to reciprocate the quills during the rotation of the tool carrier, the cam track member being supported by vertically adjustable hanger bolts 44 secured to the casing skirt member 15. The rollers 42, which rotate on horizontal axes extending radially of the tool carrier, are urged upwardly against the lower edge of the cam track member by spring counterbalances 45 connected to the quill collars by chains or cables 46.

The lower ends of the quills 29 carry respective multiple tool heads 47, here shown to be drill heads. Each drill head comprises a gear housing 48 to which the lower end of the corresponding quill is fastened. The drill head housing has journalled therein a pair of spaced vertical drill spindles 49 and 50, Fig. 4, which project downwardly from the housing 48 and carry respective drills 51 and 52. The drill spindles are disposed on opposite sides of the axis of the quill spindle 32 and are equally spaced from this axis. In the housing 48 the drill spindles are provided with respective gears 53 and 54 which mesh with mating gears 55 and 56 on a vertical shaft 57 coupled to the lower end of the quill spindle, the gearing being so arranged that the drill spindle 49, which carries the larger drill, is driven at a slower speed than the drill spindle 50.

Each drill head housing 48 has rigidly secured thereto a pair of parallel, downwardly projecting guide bars or rods 58, the lower portions of which slidably project through respective vertical bores 59 in a follower 60, the follower being suspended from the drill head housing by a central vertical tie rod 61. The lower end of the tie rod is rigidly secured to the follower, and the upper end of this rod is provided with a head 62 which has a limited sliding travel in a tubular stop member 63 secured to the lower face of the drill head housing. The follower is urged downwardly by compressed coiled springs 64 surrounding the guide rods 58. The larger drill 51 is slidable in a drill bushing 65, Figs. 4 and 7, secured to the follower by a hold-down plate 66. The spindle 50 for the smaller drill is movable in a vertical clearance bore 67 formed in the follower.

Figure 2:
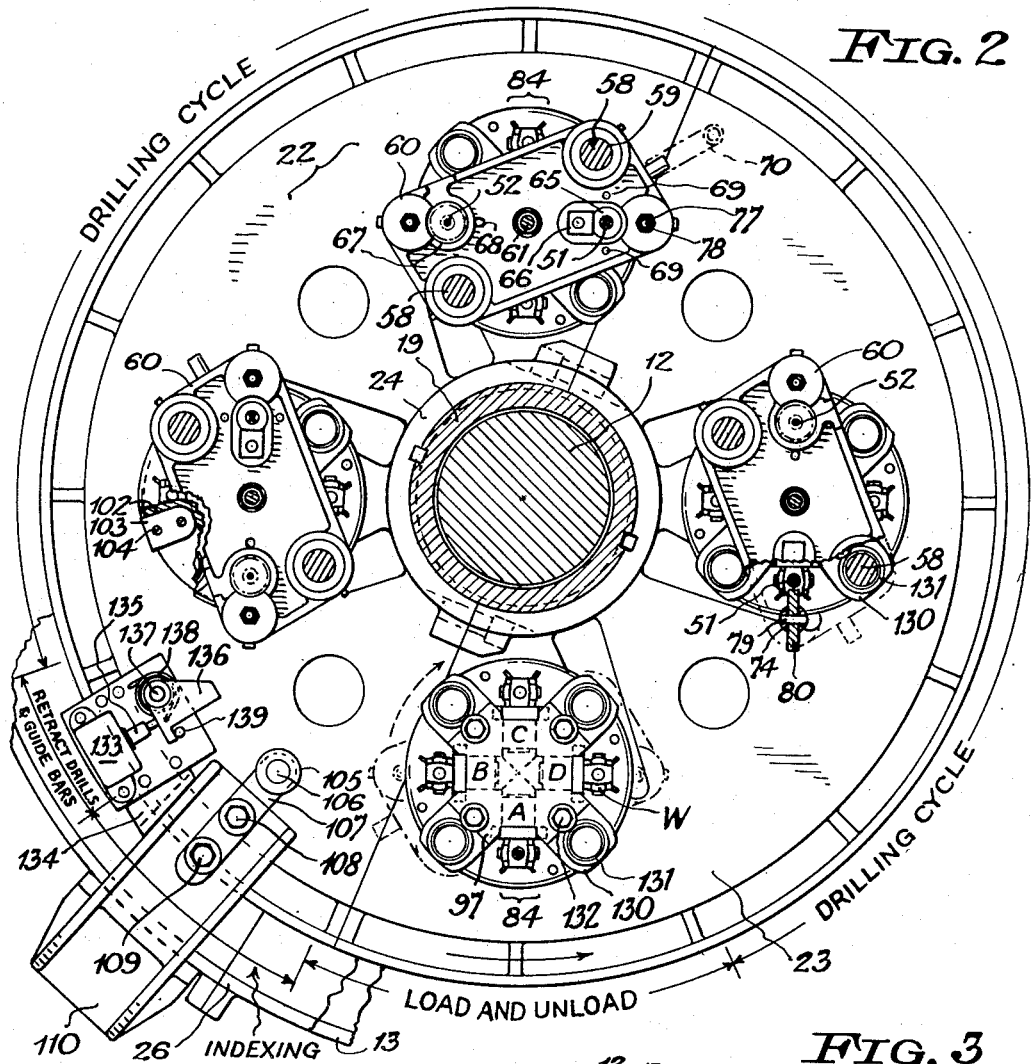
Fig. 2 is a horizontal sectional view taken generally on the line 2—2 of Fig. 1.
Figure 3:
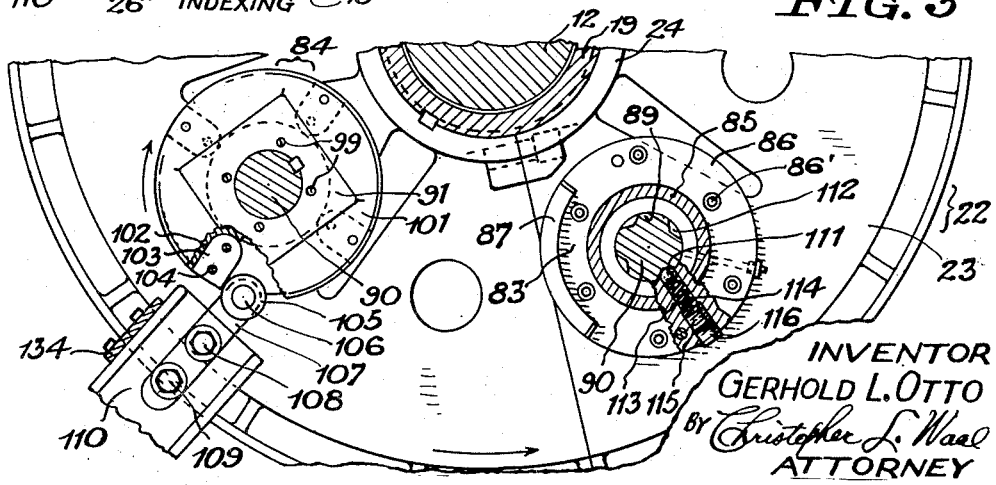
Fig. 3 is a fragmentary horizontal sectional view taken generally on the line 3—3 of Fig. 1.

Each follower 60 also forms a coolant-receiving tray, and its bottom wall has an inclined discharge nozzle 68 adjacent to the drill 52, and a pair of inclined discharge openings 69, Fig. 2, adjacent to the drill 51. The follower is supplied with coolant through a flexible hose 70 which is connected to a shut-off valve 71 communicating with an annular coolant reservoir 72 secured about the lower portion of the tool carrier 20. Each of the opposite ends of the follower has a downwardly opening vertical bore 73 which slidably receives a plunger 74 confined against rotation by a screw 75, Fig. 7. A compressed coil spring 76 urges the plunger downwardly, and the downward travel of the plunger is limited by a central vertical screw 77 having its lower end secured in the plunger and its upper end projecting above the follower and provided with adjustable stop nuts 78. The lower end of the plunger is forked and has a cross pin 79 pivotally carrying a vertical clamping plate 80 with work-clamping jaws 81. The pivoted clamping plate is biased downwardly toward the work by a coiled spring 82 housed in the plunger.

The work carrier table 23 has mounted thereon four turret bases 83 which support respective work-holding turrets 84 rotatable on vertical axes aligned with the axes of the corresponding quill spindles 29. Each turret base has a vertical tubular portion 85 and an annular flange 86 which latter is secured to the table top, as by screws 86', and is provided at its periphery with an upstanding arcuate rib 87 extending partly around the base. The tubular portion 85 of the turret base extends downwardly through an opening 88 in the table and has a vertical bore 89 in which a shaft 90 is journalled in axial alignment with the corresponding quill spindle. The projecting upper portion of the shaft 90 is keyed to a hub member 91 forming the lower part of the turret and has a head 92 engaging the upper end of the hub member. The lower end of the hub member rests on a ball thrust bearing 93 seated in the upper end of the tubular portion 85, the hub member having a sealing skirt 94 which surrounds the bearing. The rotatable shaft 90 is axially confined in the turret base by a retaining disk 95 engaging the lower end of the tubular portion 85 and secured to the lower end of the shaft by a central screw 96. The upper portion of the turret 84 is formed by a work-holding fixture 97 hereinafter more fully described, the fixture including a body member 98 secured to the flat top face of the hub member 91 by screws 99 and having a circular aligning recess 100 in which the shaft head 92 fits. The hub member 91 has at its upper portion an annular flange 101 with a plurality of equally spaced radial grooves 102 in its bottom face. Radial blocks 103, four being provided in the present instance, are secured in the grooves, as by screws 104, and have side edges adapted to engage the periphery of an indexing roller 105 during the rotation of the table. The flat bottom faces of the radial blocks 103 are adapted to engage the flat upper edge of the arcuate rib 87 of the turret base. The roller 105 is rotatable on a vertical pin 106 secured to the end portion of a supporting arm 107 which extends radially of the machine. The arm 107 is adjustably secured by a pair of vertical screws 108 and 109 to the inwardly projecting upper portion of a bracket 110, the lower portion of the bracket being fastened to the marginal wall 13 of the machine base member. The screw 108, constituting a retaining device for the arm 107, is reduced in diameter, as seen in Fig. 5, to form a shear member which will be severed if the pressure on the roller should become excessive by reason of accidental malfunctioning of the machine, whereupon the arm 107 will swing out of normal position on the pivot-forming screw 109. The turret hub member is retained in any one of four angularly spaced positions by a detent comprising a ball 111 successively engageable in four conical recesses 112 formed in the side wall of the vertical shaft 90. The detent ball 111 is disposed at the inner end of a radial bore 113 formed in the flange 86 of the turret base, and is urged inwardly by a coiled spring 114 held under compression by a screw plug 115 which is retained in adjusted position by a locking plug 116.

The work-holding fixture 97 is varied in construction to suit the work at hand, and is here shown to be arranged for the temporary support of four vertically extending connecting rods W the piston pin ends of which are to be drilled with a two-diameter lubricant-receiving opening 117, 118, Fig. 8. The upper portion of the fixture body 98 has four equally spaced radial bores 119 extending in the same horizontal plane, each bore being bushed to receive a horizontal work-supporting pin 120 having an intermediate collar 121 which is secured, as by screws 122, to the fixture body. The outer end portion of each pin is adapted to fit loosely in the piston pin end of one of the connecting rods and has a vertical bore 123 and a top groove 124. The connecting rod is suspended on the pin and is held against the collar 121 by a spring clip 125 secured to the fixture body below the pin, as by screws 126. The large end of the connecting rod is positioned between angle blocks 127 secured to the lower portion of the fixture body, and is adapted to engage an abutment block 128 secured to the fixture body. In some instances, the connecting rods may be additionally or alternatively held on their supports by permanent magnets 129 laterally secured to the fixture body.

The upper portion of the fixture body has four vertically apertured corner lugs 130 in which respective headed bushings 131 are secured by screws 132, the bushings being arranged in a circle coaxial with the fixture body and being equally spaced. The two vertical guide bars or rods 58 of each drill head are adapted to enter the diametrically opposite bushings 131 of the fixture body during the drilling operation, thus holding the fixture body firmly in proper position. The spring detent 111, 112 provides sufficiently accurate positioning of the fixture body to permit entry of guide bars into the bushings 131.

The machine is preferably provided with a safety stop switch 133 which is mounted on a bracket 134 fastened to the indexing bracket 110. The switch includes a plunger 135 which is adapted to be actuated by a bell-crank lever 136 pivotally carried on a vertical pin 137 mounted on the bracket 134. The lever 136 is urged in one direction by a torsion spring 138 against a stop pin 139, and has an arm in the path of the lower ends of the outer reciprocatory guide bars 58. Normally, the guide bars or rods for each work fixture are lifted from the work-holding fixture shortly before the indexing operation, as seen at the right-hand portion of Fig. 4, so that the outer guide bar will clear the bell-crank lever 136. However, if the guide bars of any drill head should accidently fail to lift, the outer guide bar will rock the lever 136 and actuate the stop switch 133, thus stopping the machine before the corresponding work-holding turret reaches the indexing roller 105.

In the operation of the machine, the tool carrier 20 and the work carrier 22 rotate continuously, and during each revolution of the work table 23 each work-holding turret 84 is locked to the table except for a short arc of table rotation in which the turret is indexed through 90°. Immediately following each indexing operation, the table rotates through a small arc marked "Load and Unload" in Fig. 2. In this region, the attendant removes a finished work piece from the fixture at station A and places a new work piece on the fixture at the same station. As the table revolves, each work-holding turret is successively indexed through 90° intervals, bringing the work pieces successively from the A station of Fig. 2 to the B, C, and D stations of Fig. 2, and then continuing to the A station, the complete cycle of operation requiring four revolutions of the table. When only two drills are provided, as shown, these drills operate on the work pieces at the B and D stations, and the work pieces at the A and C stations are idle. Assuming that all four work stations, A, B, C, and D, of each fixture are occupied by work pieces, as seen in Fig. 2, the table rotates away from the loading region in a counterclockwise direction. The drill heads 47 are then urged downwardly in succession by the cam track member 43, the drilling cycle extending over the major part of each revolution. As each drilling head descends, the vertical guide bars or rods 58 enter the corresponding bushings 131 in the fixture body of the associated turret so as to effect accurate positioning of the fixture body, and the jaws 81 of the yieldably mounted clamping plates 80 engage the upper parts of the two work pieces in the B and D stations to clamp each of these work pieces on the pin 120 and against the collar 121. The downward travel of each follower 60 is then stopped by its abutment with the heads of the screws 132 in the fixture body, but the associated drill head continues to move downwardly to advance the drill 51 into the work piece at station B and to advance the drill 52 into the work piece at station D. The arcuate rib 87 on the turret base resists downward pressure on the turret during the drilling operation, particularly in the region of the drilling station B, and the annular turret flange 101 protects the indexing blocks 103 and the rib 87 from chips and dirt. The large-diameter drill 51 forms the pocket 117 (Fig. 7) in the upper end of the work piece at station B, and the small-diameter drill 52 forms an oil passage 118 from the lower end of the previously formed pocket in the work piece at station D (Fig. 8). The bore 123 in the work-supporting pin 120 provides clearance for the end of the drill 52. At the end of the drilling cycle, the drills and guide bars are retracted, and shortly thereafter the work-holding turret is indexed through 90°, bringing a finished work piece to station A. The turret then enters the "Load and Unload" zone where the work piece is removed and replaced by a fresh work piece. The groove 124 in the work-holding pin provides clearance for burrs that may be formed in the work.

While the machine illustrated is arranged for performing drilling operations, it will be understood that by suitable modification the machine may perform various other tool operations, such as reaming, boring, spot facing, chamfering, milling, sawing and tapping.

One specific embodiment of the invention has been disclosed, but it will be understood that changes may be made within the scope and spirit of the invention.

What I claim as new and desire to secure by Letters Patent is:

1. In a machine tool, continuously rotatable carrier means having a plurality of tools and a plurality of indexible work turrets, said turrets having respective axes of rotation and being arranged about the rotational axis of the carrier means, means operable during the rotation of said carrier means for indexing the turrets, each turret having holding means for a plurality of work pieces and having a plurality of tooling stations to which the work pieces are successively brought by the indexing of the turret, and means operable during the rotation of the carrier means for simultaneously presenting different tools to the work pieces at different tooling stations, the tools cooperating with each turret being arranged at opposite sides of the rotational axis of the turret.

2. In a machine tool, a series of tools and a series of indexible work turrets, said turrets having respective axes of rotation, carrier means for effecting a continuous orbital travel of said tools and work turrets, means operable during the travel of said carrier means for indexing said work turrets, each turret adapted to hold a work piece in fixed position thereon and having a plurality of tooling stations to which the work piece is successively brought by the indexing of the turret, means operable during the travel of said carrier means for relatively shifting said tools with respect to said turrets for operating on the work piece at said tooling stations, and locking means controlled by the advance of said tools for holding said turrets in indexed position.

3. In a machine tool, continuously rotatable carrier means, a series of reciprocable tool heads rotatable with said carrier means and each having a plurality of tool spindles adapted to carry tools thereon, a series of indexible work turrets rotatable with said carrier means and each adapted to carry a plurality of eccentrically disposed work pieces, means for normally retaining said turrets against shifting longitudinally of said carrier means during the rotation of said carrier means, there being a tool head for each of said turrets, means operable during the rotation of said carrier means for reciprocating said tool heads with respect to said work turrets, means operable during the rotation of said carrier means for indexing said turrets, each turret having a plurality of tooling stations to which the eccentrically disposed work pieces are successively brought by the indexing of the turret for presenting each work piece to one of the tools at one of said tooling stations and to another of the tools at another of said tooling stations.

4. In a machine tool, continuously rotatable carrier means having a vertical axis of rotation and including a table, a circular series of turret bases on said table, indexible work turrets rotatably carried by said respective bases and having vertical axes of rotation, means operable during the rotation of said carrier means for indexing said turrets, each turret having holding means for a series of eccentrically disposed work pieces and having a plurality of tooling stations to which said work pieces are successively brought by the indexing of the turret, reciprocably mounted tools rotatable with said carrier means and adapted to operate on the work pieces at different tooling stations of said turrets, and means operable during the rotation of said carrier means for advancing the tools to the work pieces.

5. In a machine tool, continuously rotatable carrier means, a circular series of quills reciprocably mounted on said carrier means and extending parallel to the axis of rotation of said carrier means, spindles rotatable in said quills, reciprocatory tool heads carried on the respective quills and each having a plurality of tool spindles in driving connection with the corresponding quill spindle, a series of indexible work turrets rotatable on said carrier means and each adapted to carry a series of eccentrically disposed work pieces, means operable during the rotation of said carrier means for indexing said turrets, means for normally retaining said turrets against shifting longitudinally of said carrier means during the rotation of said carrier means, each turret having a plurality of tooling stations to which the work pieces are successively brought by the indexing of said turret, and means operable during the rotation of said carrier means for reciprocating each quill and the multiple-spindle tool head carried thereon to present one of the associated tool spindles to a work piece at one tooling station and another of said tool spindles to a work piece at another tooling station.

6. In a machine tool, continuously rotatable carrier means having a series of indexible work turrets, said turrets being rotatably mounted on said carrier means and each adapted to carry a work piece and having a plurality of tooling stations to which the work piece is successively brought by the indexing of the turret, means operable during the rotation of said carrier means for indexing said work turrets, and tool means for operating on the work pieces at said tooling stations, said indexing means including a normally stationary arm in the path of said turrets, a pivotal support for said arm, and a retaining device for said arm having a connection therewith yieldable under excessive pressure for permitting angular movement of said arm out of operative position to prevent damage to the machine.

7. In a machine tool, continuously rotatable carrier means having a series of rotatable drills and a series of indexible work turrets, means operable during the rotation of said carrier means for indexing said turrets, means for normally retaining said turrets against shifting longitudinally of said carrier means during the rotation of said carrier means, each turret adapted to hold a work piece and having a plurality of tooling stations to which the work piece is successively brought by the indexing of the turret, and means operable during the rotation of said carrier means for advancing and retracting said drills with respect to the work pieces, one of said drills being operable on the work piece at one of said tooling stations and another of said drills being operable on the work piece at another of said tooling stations.

8. In a machine tool, continuously rotatable carrier means having a series of tool means and a series of indexible work turrets, said turrets each adapted to carry a work piece and having a plurality of tooling positions to which the work piece is successively brought by the indexing of said turret for presentation to said tool means, means operable during the rotation of said carrier means for advancing and retracting said tool means with respect to the turrets, and safety stop means having a displaceable part disposed in the path of said tool means when the latter is out of retracted position, whereby to be displaceably actuated by said tool means upon failure of normal retraction of said tool means.

9. In a machine tool, continuously rotatable carrier means having a plurality of tools and a plurality of indexible work turrets each having an annular flange, means operable during the rotation of said carrier means for indexing said turrets, said indexing means including radially projecting parts on the underside of each turret flange, each work turret adapted to hold a work piece and having a plurality of tooling stations to which the work piece is successively brought by the indexing of the turret, and means operable during the rotation of said carrier means for presenting tools to the work piece, said carrier means having bearings rotatably supporting the respective turrets and further having upstanding abutments against the upper faces of which said radially projecting parts of the respective turrets bear downwardly in axial direction during the tooling operations to resist the tooling pressure.

10. In a machine tool, continuously rotatable carrier means having a series of tools and a series of indexible work turrets, each turret adapted to hold a work piece and having a plurality of tooling stations to which the work piece is successively brought by the indexing of the turret, work-positioning means carried by each turret for holding the work piece against shifting with respect to the turret, actuating means operable during the rotation of said carrier means for turning said turrets approximately to their indexed positions, feeding means operable during the rotation of said carrier means for advancing and retracting the tools with respect to said turrets, and locking means cooperating with said feeding means to effect accurate positioning of the turrets in indexed position for presentation of the tools to the work, said locking means including axially yieldable parts engageable with the work.

References Cited in the file of this patent
UNITED STATES PATENTS

| Number | Name | Date |
|---|---|---|
| 659,192 | Barry | Oct. 2, 1900 |
| 1,159,196 | Eden | Nov. 2, 1915 |
| 1,244,945 | Bell | Oct. 30, 1917 |
| 1,782,360 | Lynch | Nov. 18, 1930 |
| 1,911,304 | Brown | May 30, 1933 |
| 1,972,601 | Regan | Sept. 4, 1934 |